United States Patent Office 3,213,328
Patented Oct. 19, 1965

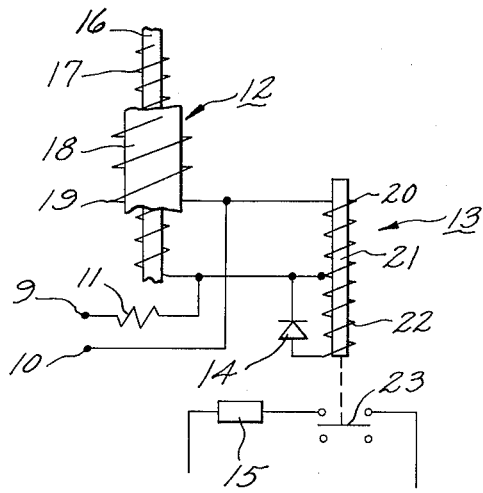
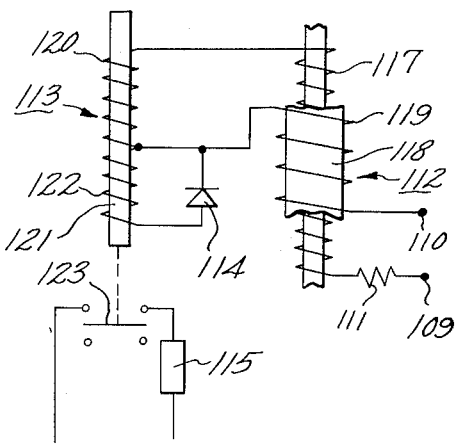
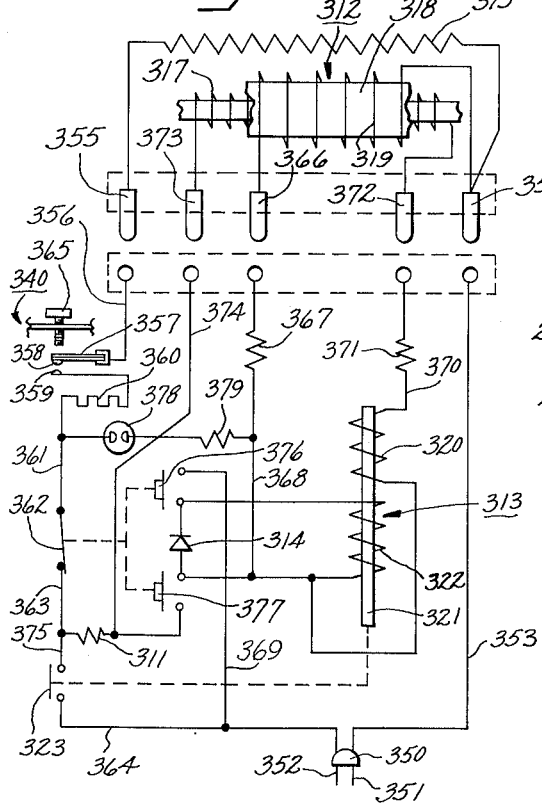
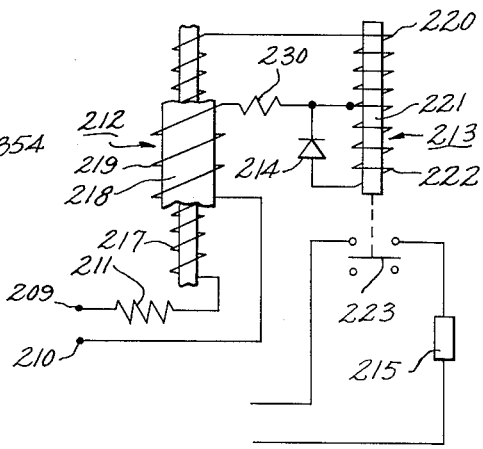

3,213,328
TEMPERATURE SENSOR SYSTEM
William D. Ryckman, Jr., Asheboro, N.C., assignor to General Electric Company, a corporation of New York
Filed Apr. 30, 1963, Ser. No. 276,930
5 Claims. (Cl. 317—132)

This invention relates to temperature sensor systems and in particular to such systems operating on alternating electric current for controlling over-temperature conditions in electrically operated apparatus.

In the development of temperature sensing systems, and particularly for such systems designed to prevent over-temperature conditions in electrical appliances such as electrical bedcovers, the characteristics of high sensitivity, quiet operation and optimum cost have been sought. Several approaches to this problem are disclosed and claimed in the co-pending application Serial No. 276,932, of William P. Somers, filed April 30, 1963, and assigned to the General Electric Company, assignee of this application.

It is an object of this invention to provide an improved temperature sensing system of high sensitivity, quiet operation and optimum production cost.

It is a further object of this invention to provide such a system for an electric bedcover to de-energize the heating element of the bedcover immediately upon the existence of an over-temperature condition therein.

In carrying out the objects of my invention in one form thereof I provide an alternating current temperature sensing system which includes a relay with a magnetic core for controlling energization of an electrically operated heating means. The magnetic core is surrounded by first and second coils in a manner such that when alternating current is supplied to the first coil, an induced current flows in the second coil; and, because it is desirable to develop a unidirectional flux in the magnetic core for satisfactory relay operation, a unidirectional circuit element is connected in a closed loop circuit with the second coil. A temperature sensor element, having an impedance which varies inversely with temperature, is electrically connected in parallel with the first coil of the relay in a circuit to which only alternating current is applied. Thus, the temperature sensor is not subjected to unidirectional current or voltage which might change its temperature responsive characteristics. An impedance is connected in electrical series with the parallel circuit including the temperature responsive element and the first relay coil, to maximize the voltage reduction across the relay coil when the impedance of the temperature responsive element decreases. This reduced voltage across the relay coil results in release or drop-out of the relay to de-energize the heating means when an over-temperature condition exists.

Other objects and advantages of my invention may best be understood by referring to the following description taken in connection with the accompanying drawing in which:

FIG. 1 is a diagrammatic view of one form of my invention;

FIG. 2 is similar to FIG. 1, with the exception that one coil of the relay is connected between the conductors of the temperature sensor;

FIG. 3 is similar to FIG. 2, a control impedance having been added thereto; and

FIG. 4 is a diagrammatic view of an electric bedcover circuit and control system incorporating my invention.

FIG. 1 shows, schematically, a control circuit which is energized by alternating current from terminals 9 and 10 and includes a current limiting element or impedance 11, a temperature sensor assembly 12, a relay 13, and a unidirectional circuit element or rectifier 14. This circuit controls the operation of an electrically operated load circuit having a heat generating load 15.

Temperature sensor assembly 12 comprises a core 16 of suitable insulating materials such as glass, rayon or other equivalent insulating fibers. A spirally wound conductor or wire 17 is wrapped on core 16, over which is extruded a layer of plastic insulating compound having an ionic additive to form a temperature sensitive layer 18 of material having a negative thermal coefficient of impedance. An outer conductor or wire 19 is spirally wound over layer 18. Finally, an outer jacket (not shown) may be applied to the assembly for insulation and may be of a material similar to that of layer 18 with the exception of the ionic additive material. Layer 18 at normal operating temperatures has a very high impedance and acts essentially as an insulator between conductors 17 and 19. However, when an over-temperature condition exists in load 15, layer 18 is heated to a temperature which sufficiently lowers the impedance of the layer for it to conduct current of control magnitude. Such a sensor assembly construction with a temperature sensing layer including an ionic additive is disclosed and claimed in Patent 2,846,560 assigned to the General Electric Company.

During normal operation, current will flow through impedance 11 and most of this current will flow through a primary coil 20 of relay 13, with only a very small amount of current flowing through temperature sensitive layer 18. Should an over-temperature occur at any point along the length of the sensor assembly, layer 18 becomes much more conductive and more of the current will flow through it, causing a decrease in current flow through primary coil 20. Of course, when layer 18 is conducting, it provides a certain electrical impedance to the flow of current therethrough.

Relay 13 includes a core 21 of magnetic material having primary coil 20 and a secondary coil 22 wound thereon. While the illustration of FIG. 1 is schematic, I prefer in practice to wind secondary coil 22 closest to core 21, with coil 20 being wound around coil 22. This provides a high inductance to resistance ($L/R$) ratio for secondary coil 22. While I prefer to use a single coil having a center tap as shown in FIG. 1, two separate coils may be used. Core 21 of the relay is arranged in a well known manner to actuate a switch 23 which controls the energization of load 15.

To provide only direct current actuation of relay 13, rectifier 14, typically of selenium is connected in a closed loop with secondary coil 22 of the relay. Upon the energization of the control circuit, coil 20 is supplied with alternating current. Coils 20 and 22 act in a manner similar to the windings of a transformer which would normally place an induced alternating voltage in coil 22; however, due to the presence of rectifier 14, current can flow only downwardly in coil 22. During the alternate half cycle rectifier 14 is blocking and no current flows upwardly to coil 22.

While it would thus appear that current would flow in coil 22 only during half of the alternating current time cycle, it has been found that as a result of the high inductance to resistance ($L/R$) ratio, the decay of current flowing in coil 22 is relatively slow and thus unidirectional current actually flows in coil 22 for at least seventy percent of each cycle when alternating voltage is applied of 60 cycles per second frequency. Such a result has been achieved by utilizing relay coils having 6,000 turns each of No. 43 wire.

In accordance with Lenz's law of induction, current flows in the secondary coil 22 in a direction to minimize the changes in the flux in core 21 and hence there is only a small change in flux during the conducting period of rectifier 14. During the thirty percent or less of each alternating current cycle when no current flows in secondary coil 22, current continues to flow in primary coil 20, and as no opposing current is present in coil 22 a large unidirectional magnetic flux is developed. The net result is the development of a unidirectional flux in the magnetic circuit of the relay with an alternating flux superimposed thereon and the relay operates much like a direct current relay supplied from a poorly filtered source. Under normal operating conditions, such a relay operates quietly without the noise or hum of alternating current relays. Furthermore, laboratory studies have shown that no component of direct current voltage appears across sensor layer 18 with this circuit.

Impedance 11 has a relatively high impedance value and is preferably a device such as a resistor, which conducts current equally well in both directions. It is, therefore, referred to herein as a symmetrical electrical impedance. Impedance 11 is connected in series circuit with both temperature sensor 12 and primary relay coil 20 to protect the circuit and to provide an increased line voltage drop when layer 18 is conducting, to thereby maximize the voltage reduction across coil 20. This insures highly sensitive control of the relay operation.

FIG. 2 reveals a schematic diagram of a preferred temperature sensing system, which is similar to that of FIG. 1, with the exception that inner conductor 117 and outer conductor 119 of the sensor assembly 112 are serially connected through primary relay coil 120. In this system, the normal operating circuit can be traced from terminal 109 through current limiting impedance 111, inner conductor 117 of the sensor, primary coil 120 of relay 113 and outer conductor 119 to terminal 110.

During the flow of current through this circuit, relay switch 123 is held closed by the unidirectional current in secondary coil 122 in a manner as explained above with respect to FIG. 1. When an over-temperature condition exists, which causes layer 118 of the sensor to conduct, the additional flow of current increases the voltage drop across impedance 111, and hence less voltage is applied to coil 120, causing the relay switch 123 to open.

This system provides the safety advantage of being "fail-safe"; i.e., should a failure take place in the temperature sensor conductors, the flow of current to relay coil 120, and therefore energization of the relay, is terminated. It should be noted that, although sensor conductors 117 and 119 are serially connected with primary relay coil 120, the sensor layer 118 remains in parallel with coil 120 and thus provides a parallel impedance when an over-temperature condition exists.

FIG. 3 reveals a circuit similar to that of FIG. 2 having a matching impedance 230 added to provide improved circuit control. The value of impedance 230 is chosen such that when added to the impedance of coil 220 their sum is approximately equal in value to the impedance of the sensor layer 218 upon the existence of an over-temperature condition. This circuit design insures a maximum reduction in voltage across coil 220 when layer 218 conducts at the predetermined over-temperature condition, thus providing immediate relay response.

FIGS. 1–3 show the control system as being completely electrically separated from the load circuit being controlled, the only connection between the circuits existing through the physical incorporation of the relay switch in the electrical load circuit. FIG. 4 shows one embodiment in which my control circuit may be used and illustrates the preferred methods by which the control circuit may be energized and de-energized in connection with the operation of an electrical bedcover. As shown schematically in the upper portion of FIG. 4, a heating wire 315 and a temperature sensor assembly 312 are distributed throughout the bedcover and are provided with a plurality of terminal pins for connection to the remaining control circuitry. The remaining control circuit elements, including a rectifier 314, an ambient responsive control 340 and a relay 313, are housed in a suitable bedside control unit. Electrical power is supplied from the usual household alternating current source of 115 volt power by means of a plug 350 having electrical terminals 351 and 352.

The electrical bedcover heating circuit is energized through a circuit commencing with terminal 351 at the power plug, through a connecting conductor 353 to a terminal 354 leading to the right-hand end of electric heater wire 315. The opposite end of the electric heater wire is connected to terminal 355 of the bedcover from which connection is made through conductor 356 to ambient responsive control assembly 340 in the bedside control. In the usual manner, the ambient responsive control includes a bimetallic blade 357 carrying on one end a contact 358 adapted to engage a cooperating contact 359 associated with one end of a heater 360 oriented in close proximity to bimetallic blade 357. When the bimetallic blade 357 deflects downwardly, responsive to a relatively cool temperature, the heating circuit is completed through contacts 358 and 359 to conductor 361. A normally closed safety switch 362, a conductor 363, relay switch 323, and conductor 364 complete the circuit to the other side of the power supply at terminal 352. Thus, electric current flows through heating wire 315 and through bimetallic blade 357 of the ambient responsive control along with heater 360, the safety contacts, and the relay switch. As this electric current causes heat to emanate from heating wire 315 in the blanket, heater 360 also warms bimetallic blade 357, causing is to deflect upwardly to open the circuit. Thereafter, the bimetallic blade cools and the circuit again closes; such cycling continues to maintain the desired temperature of the bedcover. Suitable adjustment means 365 may be associated with the ambient responsive control, whereby the user can select the temperature at which cycling occurs and thus can select the average temperature maintained by the electric bedcover.

Under normal circumstances, the electric bedcover operates in the above-described manner, with the ambient responsive control regulating the percent of "on" time during which the electric heater 315 is energized, responsive to the manual setting and the temperature within the room in which the blanket is operating. Relay switch 323 ordinarily remains closed, so that electric power is conducted to the heating element whenever the contacts 358 and 359 of the ambient responsive control are closed. However, under certain circumstances, a serious over-temperature can exist at a small or localized area of the blanket while the rest of the blanket is operating normally and the ambient responsive control is closed, calling for additional heat. It is at this time that a reliable separate sensor system and control becomes of critical importance to the user.

The control circuit of FIG. 4 is energized through the following means; from terminal 351, through conductor 353 and connector pin 354 to the right-hand end of the sensor, with a connection being made at this point to the outer wire 319. The electric circuit then continues through the blanket, through outer conductor 319 of the sensor to terminal pin 366. Terminal pin 366 is adapted to be connected to a terminal in the bedside control for connection with a start resistor 367. The opposite end of resistor 367 is connected through a common conductor 368, to relay coils 320 and 322. Considering now only relay coil 320, the circuit is completed through a conductor 370, an impedance matching resistor 371 to a terminal pin 372, which makes connection with one end of inner sensor wire 317. The opposite end of inner wire 317 of the sensor is connected through a terminal pin 373 from which current flow may continue through conductor 374 and a current limiting impedance or resistor 311 to conductor 375 from which the circuit is completed to the other side of the power line through relay switch 323 and conductor 364. Secondary relay coil 322 is connected in a closed loop in which is included a rectifier 314 by which the relay operates without hum on alternating current, as described above.

While there are various ways in which the relay may be initially energized for the closure of switch 323, it is preferred to energize the relay electrically by means of an "on" switch 376 which is momentarily depressed to close the switch and energize the relay. This relay "pick-up" circuit may be traced commencing with power supply terminal 351, through conductor 353, terminal pin 354, outer conductor 319, terminal pin 366, start resistor 367, conductor 368, coil 322, "on" switch 376, and conductor 369 to the opposite side of the power supply. In this instance, start resistor 367 has a resistance of 4700 ohms and protects the circuit against an excessive current flow while also allowing sufficient current to flow though secondary relay coil 322 to cause the initial "pick-up" of the relay. Such a separate start circuit is necessary as very little transformer action takes place with relay switch 323 open, due to the large air gap in the magnetic circuit.

The momentary "on" switch 376 is operated by a suitable actuator which is connected mechanically to safety switch 362 in a manner to open the safety switch whenever the "on" switch actuator is depressed. Thus, the main heating circuit remains ineffective whenever the "on" button is pressed to its closed position. This is an important safety feature of the circuit, in that a user may not defeat or bypass the safety circuit by jamming the "on" switch closed. Once the relay has been energized through its coil 322, it remains energized through the combination of coils 320 and 322, as previously described. Thus, relay switch 323 is closed and electric power can be supplied through the ambient responsive switch assembly to the heating element 315 in the bedcover.

As above described, the circuit which holds the relay closed includes current limiting resistor 311, the inner conductor 317 of the sensor assembly, impedance matching resistor 371, relay coil 320, start resistor 367, and outer wire 319 of the sensor assembly. Under normal operating conditions, there is essentially no current flow through temperature sensitive layer 318. The values of the resistors are so selected in connection with the relay design that sufficient voltage remains on relay coil 320 during normal operation to maintain relay switch 323 in its closed position. When an over-temperature condition exists in the blanket at any point along the length of the sensor assembly, current flow occurs through layer 318 from the inner conductor to the outer conductor. The increased current flow through the control circuit creates a greater proportion of total line voltage across current limiting resistor 311 such that the voltage on relay coil 320 is reduced sufficiently to open the magnetic circuit of the relay, upon which relay switch 323 opens to terminate further operation of the bedcover. The bedcover does not again function until such time as the operator manually closes "on" switch 376.

There are various ways in which the relay may be de-energized when it is desired to turn off the electric bedcover. For example, the relay switch 323 may be manually opened. However, I prefer an electrical turn-off by means of a momentary "off" switch 377.

As can be seen in FIG. 4, when "off" switch 377 is manually closed, a circuit is closed from terminal 351 through terminal 354, outer sensor wire 319, terminal 366, start resistor 367, conductor 368, the "off" switch, current limiting resistor 311, relay switch 323 and conductor 364 to terminal 352. Thus, impedance matching resistor 371 and the inner wire of the sensor assembly are short circuited. The over-all control circuit is still protected, however, since resistor 311 remains in the circuit along with start resistor 367. However, when the "off" switch is actuated, essentially no voltage appears across relay winding 320, and hence the relay releases its armature and the relay switch opens.

To provide a visual indication that the blanket circuit is operating, it is a common practice to provide a suitable indicator light, such as a neon glow lamp 378. A current limiting resistor 379 is connected in series with the glow lamp. The circuit for energizing lamp 378 may be traced from power terminal 351, through terminal pin 354, the outer wire 319 of the sensor assembly, pin 366, start resistor 367, current limiting resistor 379, the neon glow lamp, safety switch 362, conductor 361, safety switch 362, conductor 363, relay switch 323, conductor 364 to the other side of the line to power terminal 352. Thus, whenever the relay switch 323 and safety switch 362 are closed, the glow lamp will be energized, signifying to the user that bedcover is operative.

To provide the desired operation for the circuit of FIG. 4, the following values have proven satisfactory for the various circuit elements: current limiting impedance 311—82,000 ohms, start resistor 367—4,700 ohms, impedance matching resistor 371—68,000 ohms, rectifier 314—forward voltage drop of approximately one volt, temperature sensitive layer 318 at relay "drop-out" with 125 line volts—67,500 ohms and slightly capacitive, and relay coil 320—5,400 ohms and slightly inductive when the relay is in "pick-up" and including the transformer effect of coil 322 and rectifier 314. Each relay coil has 6,000 turns.

I have thus provided a highly safe load control system having a high sensitivity to overheat conditions with a minimum of noise. This is achieved through a control system of optimum cost using a direct current relay cooperating with a temperature sensor which is connected across an alternating current source.

While I have shown and described specific embodiments of my invention, I do not desire my invention to be limited to the particular constructions shown and described. Instead, I intend by the appended claims to cover all modifications within the spirit and scope of my invention.

What I claim is:

1. An alternating current temperature sensor system for an electrically operated heating means comprising:
   (a) a relay including:
      (aa) a magnetic core,
      (bb) a first coil on said core,
      (cc) a second coil on said core in which a voltage is induced upon energization of said first coil, and
      (dd) contacts for controlling energization of the heating means operated by said core;
   (b) a temperature sensor element connected in electrical parallel with said first coil and having an impedance which varies with the temperature of the heating means;
   (c) an electrical impedance in series with both said first coil and said sensor element;
   (d) means for connecting said impedance and said first coil across a source of alternating current power; and
   (e) a unidirectional circuit element in a closed loop circuit with said second coil for developing a unidirectional flux in said magnetic core so that relay noise is prevented and alternating voltage is maintained across said sensor element.

2. The temperature sensor system recited in claim 1 wherein said first and second coils have respective ends electrically connected to one another and wherein said secondary coil is wound closest to said magnetic core with said first coil being wound on said second coil to maximize the inductance to resistance ratio of said secondary coil.

3. An alternating current temperature sensor system for an electrically operated heating means comprising:
   (a) a relay including:
      (aa) a magnetic core,
      (bb) first and second coils on said core, said second coil being arranged so that a voltage is induced therein upon energization of said first coil,
      (cc) contacts for controlling energization of the heating means operated by said core;

(b) a temperature sensor comprising a pair of conductors in contact with and separated by a layer of material, said material including an insulating compound having an ionic additive to provide a negative thermal coefficient of impedance, said conductors being connected to said first relay coil with said layer in electrical parallel to said first coil;

(c) an electrical impedance in series with both said first relay coil and said sensor layer;

(d) means for connecting said impedance and said first relay coil across a source of alternating current power; and (e) a unidirectional circuit element in a closed loop circuit with said second coil for developing a unidirectional flux in said magnetic core to provide unidirectional current flow through said second coil during the major portion of a complete alternating voltage cycle while maintaining alternating voltage on said sensor layer.

4. An alternating current temperature sensor system for an electrically operated load comprising:

(a) a relay including:
 (aa) a magnetic core,
 (bb) a first coil on said core,
 (cc) a second coil on said core in which a voltage is induced upon energization of said first coil, and
 (dd) load control contacts operated by said core;

(b) a temperature sensor element comprising a pair of conductors in contact with and separated by a layer of material having a variable impedance and being responsive to the load temperature, said first relay coil being connected between said pair of conductors in electrical series therewith and in electrical parallel with said layer;

(c) an electrical impedance in series with said conductors and said first coil;

(d) means for connecting said impedance, sensor conductors, and first relay coil across a source of alternating current power; and (e) a unidirectional circuit element in a closed loop circuit with said second coil for developing a unidirectional flux in said magnetic core to prevent relay noise and to maintain alternating voltage across said sensor material layer.

5. An alternating current temperature sensor system for a bedcover having an electrical heating element comprising:

(a) a relay including:
 (aa) a magnetic core,
 (bb) a first coil on said core,
 (cc) a second coil on said core in which a voltage is induced upon energization of said first coil, and
 (dd) contacts operated by said core to control energization of the bedcover heating element;

(b) a temperature sensor comprising a pair of conductors in contact with and separated by a layer of material having a relatively high impedance at normal operating temperatures and a lower impedance at abnormally high temperatures, said first relay coil being connected between said pair of conductors in electrical series therewith so that said layer is in electrical parallel with said first relay coil;

(c) an electrical impedance in series with said conductors and said first relay coil;

(d) means for connecting said impedance, sensor conductors and first relay coil across a source of alternating current;

(e) a unidirectional circuit element in a closed loop circuit with said second coil for developing a unidirectional flux in said magnetic core to provide unidirectional current flow through said second coil during the major portion of a complete alternating voltage cycle; and (f) a matching impedance connected between one of said conductors and said first relay coil having an impedance value such that the sum of its value and the impedance of said first relay coil is substantially equal to the value of impedance of said sensor layer at an abnormally high temperature for immediate relay response to an over-temperature condition to de-energize said bedcover heating element.

References Cited by the Examiner

UNITED STATES PATENTS

| | | | |
|---|---|---|---|
| 2,046,748 | 7/36 | Hudson | 317—52 X |
| 2,529,118 | 11/50 | Tschumi | 317—155.5 X |
| 2,565,478 | 8/51 | Crowley | 317—132 X |
| 2,613,254 | 10/52 | King | 317—139 X |
| 2,924,754 | 2/60 | Mead | 317—128 X |
| 3,114,820 | 12/63 | Holmes | 219—494 X |

SAMUEL BERNSTEIN, *Primary Examiner.*